United States Patent
Hall

(10) Patent No.: US 11,421,403 B2
(45) Date of Patent: Aug. 23, 2022

(54) BUCKET TOOTH MONITORING SYSTEM

(71) Applicant: Caterpillar Inc., Peoria, IL (US)

(72) Inventor: James C. Hall, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 206 days.

(21) Appl. No.: 16/849,706

(22) Filed: Apr. 15, 2020

(65) Prior Publication Data

US 2021/0324611 A1 Oct. 21, 2021

(51) Int. Cl.
| | |
|---|---|
| *E02F 9/26* | (2006.01) |
| *G01V 3/08* | (2006.01) |
| *B60Q 5/00* | (2006.01) |
| *E02F 9/24* | (2006.01) |
| *E02F 9/20* | (2006.01) |
| *B60Q 9/00* | (2006.01) |
| *H02J 7/00* | (2006.01) |

(52) U.S. Cl.
CPC ............... *E02F 9/26* (2013.01); *B60Q 5/005* (2013.01); *B60Q 9/00* (2013.01); *E02F 9/2025* (2013.01); *E02F 9/24* (2013.01); *G01V 3/08* (2013.01); *H02J 7/0047* (2013.01); *H02J 7/0063* (2013.01)

(58) Field of Classification Search
CPC ......... B60Q 5/005; B60Q 9/00; E02F 9/2025; E02F 9/24; E02F 9/26; G01V 3/08; H02J 7/0047; H02J 7/0063
See application file for complete search history.

(56) References Cited

U.S. PATENT DOCUMENTS

| | | | |
|---|---|---|---|
| 5,743,031 A | 4/1998 | Launder | |
| 7,181,370 B2* | 2/2007 | Furem | E02F 9/205 |
| | | | 701/50 |
| 8,890,672 B2 | 11/2014 | Miller | |
| 9,670,649 B2* | 6/2017 | Bewley | E02F 9/2833 |
| 10,008,095 B2* | 6/2018 | Reyes-Rodriguez | E02F 9/267 |
| 10,011,975 B2* | 7/2018 | Carpenter | E02F 9/2833 |
| 10,024,034 B2* | 7/2018 | Nicoson | E02F 9/267 |
| 2003/0112153 A1 | 6/2003 | Lujan et al. | |
| 2004/0227645 A1* | 11/2004 | Lujan | E21F 17/18 |
| | | | 340/870.07 |

FOREIGN PATENT DOCUMENTS

| | | |
|---|---|---|
| CN | 107288173 A | 10/2017 |
| EP | 3327205 | 5/2018 |
| WO | 2018095536 | 5/2018 |

\* cited by examiner

*Primary Examiner* — Tyler J Lee

(74) *Attorney, Agent, or Firm* — Harrity & Harrity LLP

(57) ABSTRACT

According to some implementations, a magnetic sensor may include a communication device; a magnetic switch; and a controller configured to: determine whether the magnetic switch is actuated by a magnet associated with the bucket tooth; generate, based on determining whether the magnetic switch is actuated, a message concerning an attachment status of the bucket tooth; and cause the communication device to wirelessly transmit the message.

20 Claims, 6 Drawing Sheets

BUCKET TOOTH MONITORING SYSTEM

TECHNICAL FIELD

The present disclosure relates generally to a bucket tooth system and, for example, in monitoring the loss of a bucket tooth using the bucket tooth monitoring system.

BACKGROUND

A mining bucket may be used in conjunction with various machines to assist in moving material applications, such as digging, trenching, and excavating. The mining bucket may include various accessory components, such as bucket teeth, that may be used to help in moving material applications. The bucket teeth may provide a smaller surface area during moving material applications, thus requiring less force than the larger surface area of the mining bucket. This may also help preserve the longevity of the mining bucket.

However, the bucket teeth may detach from the mining bucket as a result of repeated mechanical impact during moving material applications. The loss of a bucket tooth may result in causing additional wear and tear on the intact/undamaged bucket teeth, as well as the bucket itself. In some cases, broken/detached bucket teeth may become intermixed with the mined material. If the bucket teeth are not filtered out, the bucket teeth may unintentionally go through a crusher, thus damaging the crusher which may be designed to crush softer materials than the bucket teeth.

One attempt to monitor the loss of teeth from mining buckets is disclosed in U.S. Pat. No. 8,890,672 B2 that issued to Miller on Nov. 18, 2014 ("the Miller patent"). In particular, the Miller patent discloses a system of using a radio frequency identification (RFID) reader with a RFID tag to monitor a machine tooth for heavy equipment by coupling an RFID tag to the heavy machine tooth and positioning an RFID reader to read the RFID tag. In particular, the Miller patent discloses detecting and locating heavy machine teeth by using an RFID reader located on a structure through which a truck passes after being filled, and triggering an alarm if an RFID tag is detected.

While the system and method of the Miller patent uses RFID technology to detect and locate loose machine teeth, the Miller patent does not disclose a magnetic technology to identify a location of a loose tooth or a real-time monitoring system. Instead, the Miller patent discloses a system in which an active RFID tag is attached to the tooth, and an RFID reader is located on a structure through which a truck passes to detect whether the tooth has fallen off into the truck.

The system of the present disclosure solves one or more of the problems set forth above and/or other problems in the art.

SUMMARY

According to some implementations, a component monitoring system may include an attachment means positioned on an interior portion of a component of a work machine and configured to engage with a sensor via a switch; and the sensor positioned on a portion of an adapter of the work machine that interfaces with the component, the sensor comprising: the switch configured to actuate when engaged with the attachment means; a communication device configured to wirelessly transmit at least one message concerning an attachment status of the component; a power source configured to provide power to the communication device, the switch, and a controller; and the controller configured to: determine whether the switch is actuated; generate, based on determining whether the switch is actuated, a message concerning the attachment status of the component; determine, after generating the message, a message transmission rate; and cause the communication device to wirelessly transmit the message according to the message transmission rate.

According to some implementations, a magnetic sensor may include a communication device; a magnetic switch; and a controller configured to: determine whether the magnetic switch is actuated by a magnet associated with the bucket tooth; generate, based on determining whether the magnetic switch is actuated, a message concerning an attachment status of the bucket tooth; and cause the communication device to wirelessly transmit the message.

According to some implementations, a method may include receiving, by a controller associated with a work machine and from a magnetic sensor, a message concerning an attachment status of a bucket tooth of a bucket of the work machine; determining, by the controller and based on the message, the attachment status of the bucket tooth; selectively causing, by the controller and based on the attachment status of the bucket tooth, at least one component of the work machine to provide an alert; and selectively causing, by the controller and based on the attachment status of the bucket tooth, one or more actions to be performed.

DETAILED DESCRIPTION

This disclosure relates to a bucket tooth monitoring system. The bucket tooth monitoring system has universal applicability to any machine utilizing an accessory such as bucket, and detachable accessory component such as bucket teeth. The term "machine" may refer to any machine that performs an operation associated with an industry such as, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other above ground equipment, underground equipment, or marine equipment.

Figure 1:
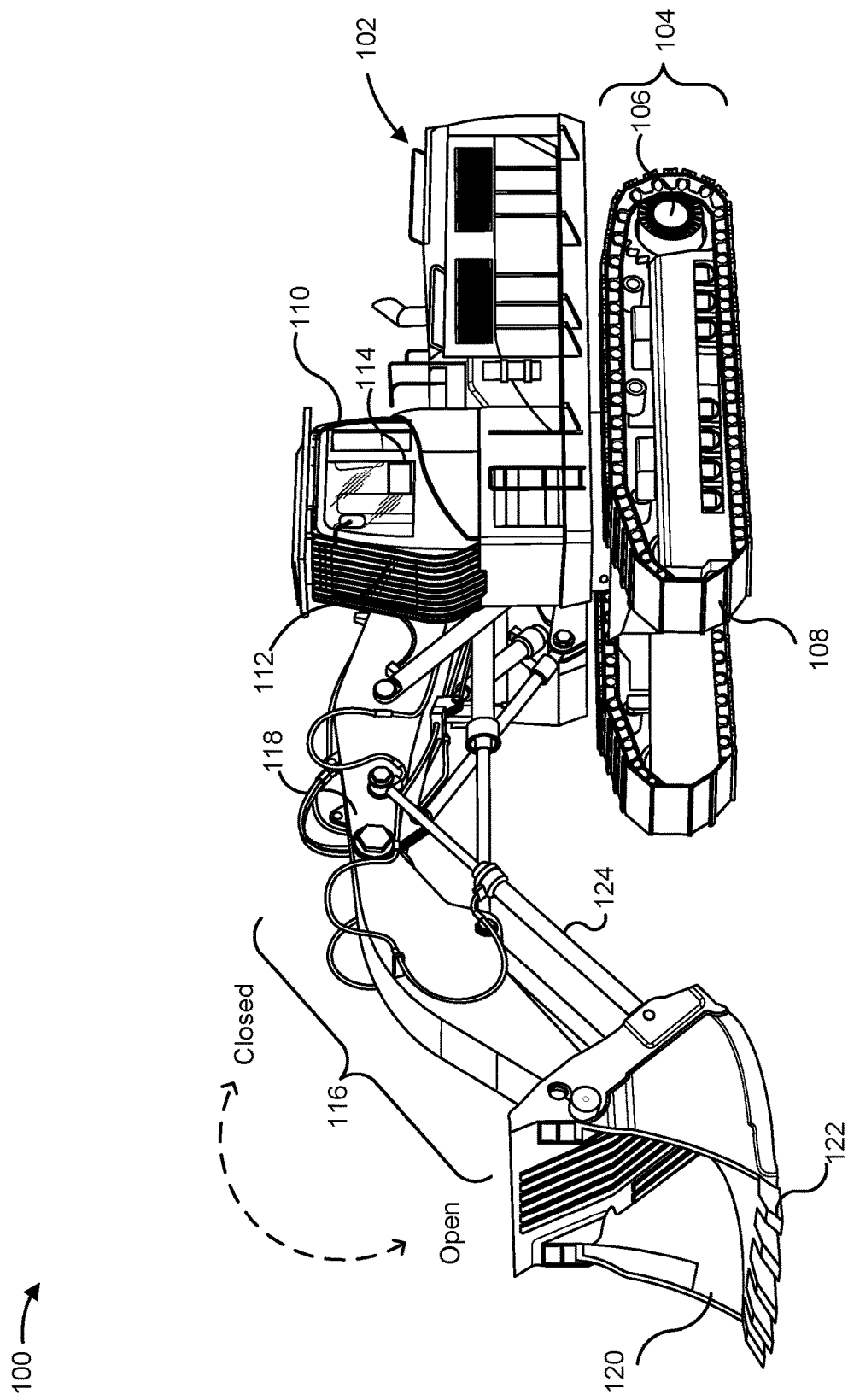
FIG. 1 is diagram of an example machine with a bucket having bucket teeth described herein.

FIG. 1 is diagram of an example machine 100 described herein. The machine 100 is shown in FIG. 1 as an excavator but may include any type of machine that may utilize a bucket tooth monitoring system as described herein. Accordingly, the machine 100, as described herein, may perform an operation (e.g., at a worksite) associated with penetrating, digging, displaying, transporting, and/or dumping material (e.g., "material" may refer to ground material at a worksite).

As shown, the machine 100 may have a body 102 and a support structure 104 that includes a drive system 106 and traction system 108. The body 102 may be rotatable relative to the support structure 104 (e.g., to displace or transport ground material during operation of machine 100). As shown, the body 102 includes an operator station 110 including an operator interface 112 that can be used to operate the machine 100. For example, the operator interface 112 may include one or more input devices (e.g., buttons, keypads, touchscreens, trackballs, joy sticks, levers, pedals, steering mechanisms, and/or the like) and/or output devices (e.g., displays, illumination indicators, speakers, and/or the like). In some implementations, the operator station 110 and/or one or more components of the operator interface 112 may be remotely located (e.g., not onboard the machine 100). In such a case, the machine 100 may be remotely controlled, may remotely receive communications to perform operations (e.g., in association with autonomous control of the machine 100), and/or the like.

The machine 100 includes an electronic control module (ECM) 114 configured to control various operations of the machine 100. The ECM 114 may control the operation according to inputs from operator interface 112. In some implementations, the ECM 114 may be configured to autonomously control an operation of the machine. For example, the ECM 114 may process instructions associated with controlling various components of the machine 100 to perform an operation, as described herein.

The machine 100 also has a power source (e.g., an internal combustion engine, a generator, a battery, and/or the like) configured to supply power to the machine 100 and/or components of machine 100. The power source may be operably arranged to receive control signals from the operator interface 112 in the operator station 110. Additionally, the power source may be operably arranged with the drive system 106, an implement 116 coupled to the body 102, and/or one or more rotational members to selectively operate the drive system 106, to selectively operate the implement 116, and/or to selectively rotate the body 102 relative to the support structure 104 according to control signals (e.g., received from the operator interface 112). The power source may provide operating power for the propulsion of the drive system 106, the operation of the implement 116, and/or the rotation of the body 102 about a rotation axis.

The drive system 106 may be operably arranged with the power source to selectively propel the machine 100 via control signals from the operator interface 112. The drive system 106 may be operably connected to a plurality of ground-engaging members, such as traction system 108, as shown, which may be movably connected to the machine 100 and the body 102 through axles, drive shafts, a transmission, and/or other components and which may be movably connected to the power source and the drive system 106. The traction system 108 may be provided in the form of a track-drive system, a wheel-drive system, and/or any other type of drive system configured to propel the machine 100 forward and/or backward. For example, the traction system 108 may include a pair of tracks that can be independently operated in a forward or reverse direction in order to move the machine 100 forward, move the machine 100 backward, turn or otherwise change a travel direction, and/or the like. The drive system 106 may be operably arranged with the power source to selectively operate the implement 116, which may be movably connected to the machine 100, the body 102, and the drive system 106.

The implement 116 may be operably arranged with the drive system 106 such that the implement 116 is movable through control signals transmitted from the operator interface 112 to the drive system 106. The implement 116 illustrated in FIG. 1 includes a boom 118 mechanically coupled with a bucket 120 that includes a plurality of ground engaging tools (which may be referred to herein individually as a "bucket tooth 122" and collectively as "bucket teeth 122"). A hydraulics system 124 of the implement 116 may be powered by the power source and controlled by the operator interface 112 to adjust a position of the boom 118 and/or the bucket 120. As shown by the dashed arrow, the bucket 120 may pivot about an end of the boom 118 between an open position and a closed position (e.g., to facilitate a digging operation, a holding operation, a dumping operation, and/or the like). Other implementations can include any other suitable implement for various tasks, such as, for example, dozing, blading, brushing, compacting, grading, lifting, ripping, plowing, and/or the like. Example implements include dozers, augers, buckets, breakers/hammers, brushes, compactors, cutters, forked lifting devices, grader bits and end bits, grapples, and/or the like. The bucket teeth 122 may be associated with components of a bucket tooth monitoring system of example implementation 200, described in more detail in FIGS. 2-4.

Figure 2:
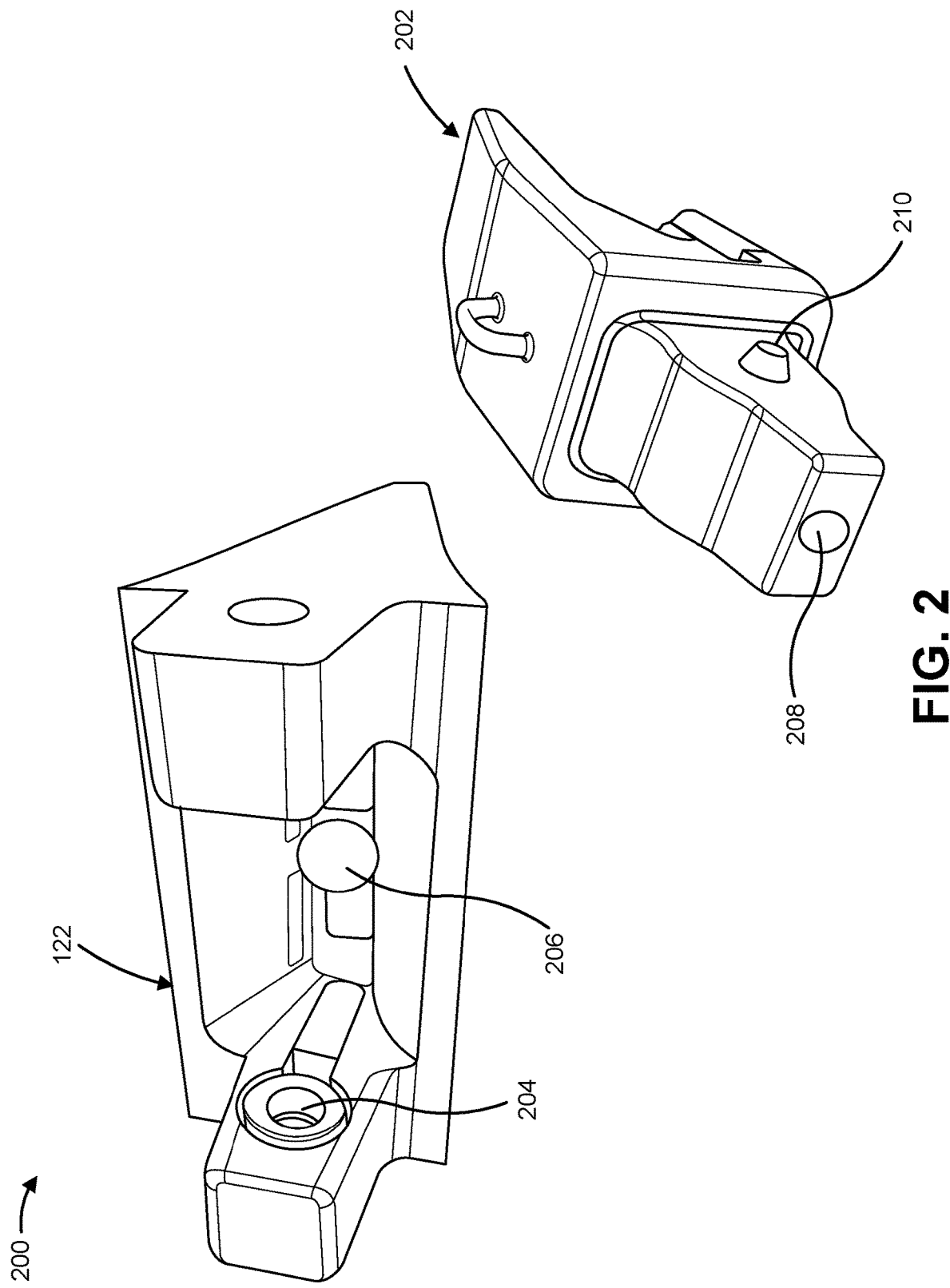
FIG. 2 is a diagram of example components of a bucket tooth monitoring system described herein.

FIG. 2 is a diagram of an example implementation 200 described herein. Example implementation 200 illustrates components of a bucket tooth monitoring system. As described herein, a bucket tooth 122 is attached to a bucket 120 via an adapter 202. The adapter 202 may be designed to be removable from the bucket 120 or be permanently fixed (e.g., welded directly onto the bucket 120). The adapter 202 is equipped with a magnetic sensor 208 and a projection 210. The bucket tooth 122 is equipped with a recess 204 and a magnet 206. The magnet 206 may be positioned on an interior portion of the bucket tooth 122. The magnet 206 may be configured to magnetically engage with the magnetic sensor 208 via a magnetic switch 404 (described below in connection with FIG. 4) on the magnetic sensor 208.

In some implementations, when the bucket tooth 122 is fitted with the adapter 202, the projection 210 is inserted into corresponding recess 204. In addition, when the bucket tooth 122 is fitted with the adapter 202, the magnet 206 of the bucket tooth 122 is operably connected with the magnetic sensor 208 of the adapter 202 (e.g., the bucket tooth 122 is a housing for the adapter 202). In some implementations, the magnetic sensor 208 may instead be located on the bucket tooth 122 and the magnet 206 may instead be located on the adapter 202. Additionally, or alternatively, the magnetic sensor 208 or magnet 206 may be located in a lip shroud, wing shroud, heel shroud, and/or the like that may be used on the bucket 120.

Figure 3:
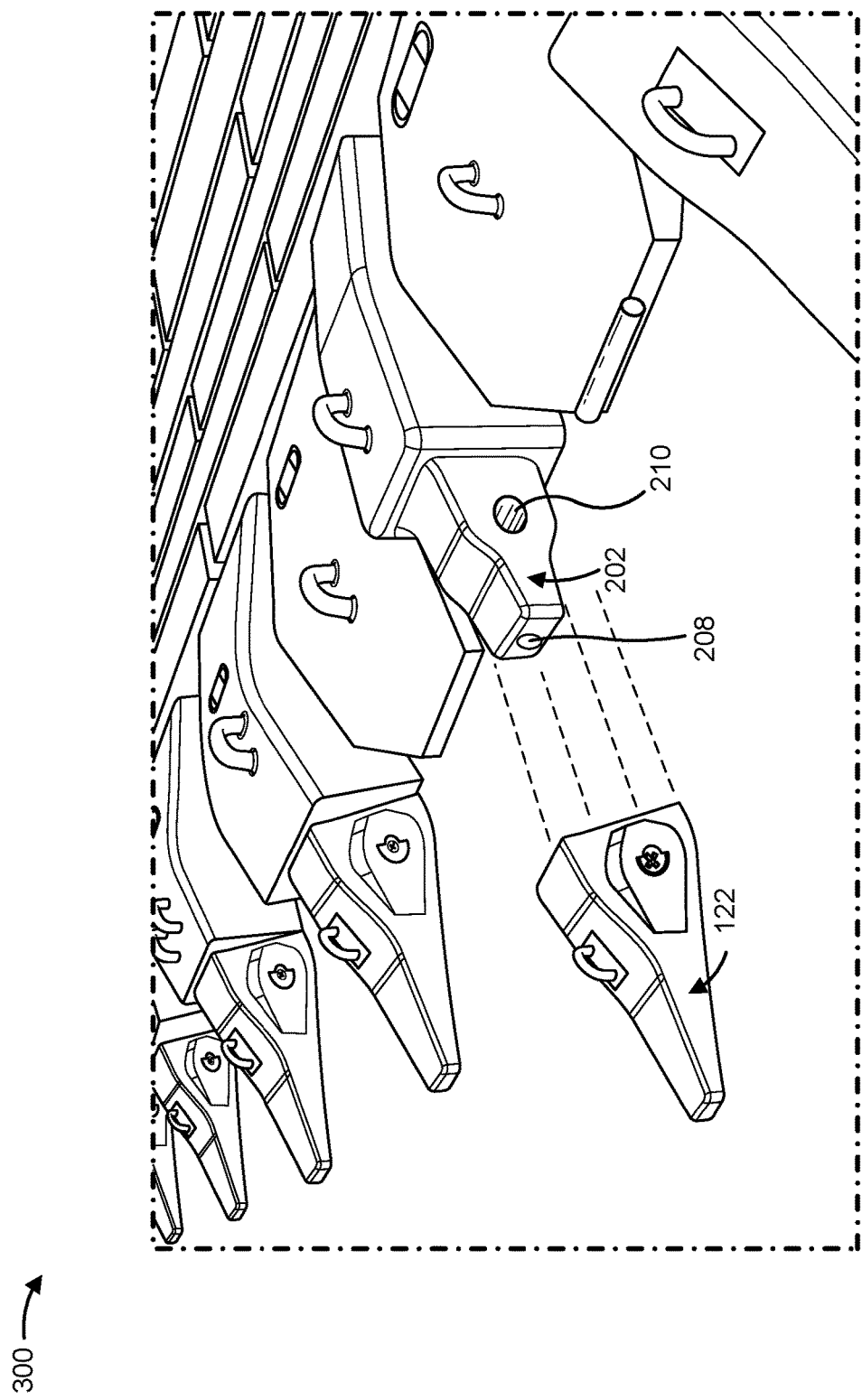
FIG. 3 is a diagram of an example implementation of bucket tooth monitoring system described herein.

FIG. 3 is a diagram of an example implementation 300 described herein. Example implementation 300 illustrates an implementation of a bucket tooth monitoring system. As described herein, a bucket tooth 122 is attached to an adapter 202 as illustrated. The adapter 202 may include a magnetic sensor 208. Bucket tooth 122 may attach to the adapter 202 in which a recess (e.g., recess 204) on the bucket tooth 122 locks onto a projection (e.g., projection 210) of the adapter 202. The magnet 206 may become magnetically engaged with the magnetic sensor 208 of the adapter 202 when the bucket tooth 122 is attached to the adapter 202.

The bucket tooth 122 may become dislodged from the adapter 202, and thus detached from the bucket 120 and/or the machine 100. This detachment may break the electromagnetic connection of magnet 206 and the magnetic sensor 208 of the adapter 202. This may cause a magnetic switch 404 (FIG. 4) located in magnetic sensor 208 to switch state (e.g., open to closed, closed to open, and/or the like). Based on the determination that the magnetic switch 404 is actuated, the magnetic sensor 208 may perform one or more actions. For example, the magnetic sensor 208 may indicate an attachment status of the bucket tooth 122 of the bucket 120, via a notification.

Figure 4:
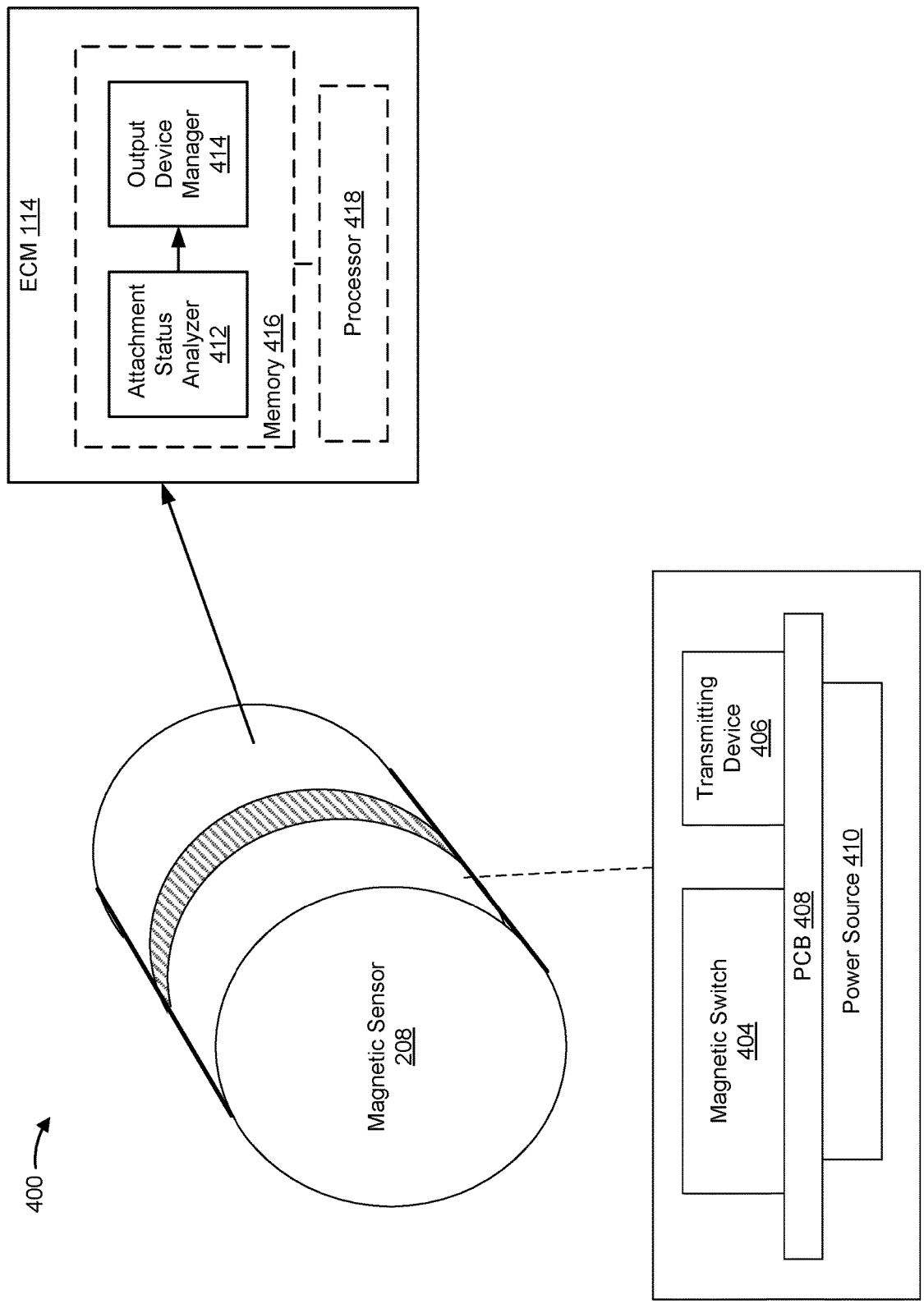
FIG. 4 is a diagram of example components of a magnetic sensor described herein.

FIG. 4 is a diagram of an example implementation 400 described herein. In particular, example implementation 400 illustrates a few of the components of the magnetic sensor 208 and how the magnetic sensor 208 interacts with the ECM 114. As shown in FIG. 4, the magnetic sensor 208 may include a magnetic switch 404, a communication device 406, a printed circuit board (PCB) 408, and a power source 410.

The magnetic switch 404 may be configured to actuate when the magnetic switch 404 is magnetically engaged with the magnet 206. The magnetic switch 404 may be in one of various states (e.g., an open state, a closed state, and/or the like). An open state may indicate that the magnetic sensor 208 is operably connected to a magnet, such as the magnet 206, whereas a closed state may indicate that the magnetic sensor 208 is no longer operably connected with the magnet. The states can vary with one state indicative of an operable connection between the magnet 206 and the magnetic sensor 208 and the other state indicative that the magnetic sensor 208 is no longer operably connected with the magnet 206. That is, one state indicates that the magnetic switch 404 is actuated and the other state indicates that the magnetic switch 404 is not actuated. The magnetic switch 404 may include one or more of a reed switch, a Hall Effect sensor, a magnetometer, and/or the like. The magnetic switch 404 may include a solid-state device to change the switch from one state to another without any moving mechanical parts that may become dislodged during the course of using the bucket 120. This may assist in the longevity of the magnetic switch 404, since the operation of the machine 100 may interfere with the operation of mechanical parts in magnetic switch 404. Also, this may result in a loss of operability of the magnetic switch 404 or error-prone operability of the magnetic switch 404, such as incorrect stage changes.

Communication device 406 may include a transceiver-like component (e.g., a transceiver, a separate receiver, a separate transmitter, and/or the like) that enables the magnetic sensor 208 to communicate with other devices, such as via a wireless connection. Communication device 406 may permit the magnetic sensor 208 to receive information from another device and/or provide information to another device. The communication device 406 may be configured to transmit at least one message via wireless communication link concerning an attachment status of the bucket tooth 122. The communication device 406 may include a wireless local area network (WLAN) component, a wireless personal area network (WPAN) component, a radio rate (RF) communicate component, or a cellular network connection component. In some implementations, the communication device 406 may transmit information related to the power source 410. For example, the communication device 406 may transmit information indicating a voltage status of the power source 410. In some implementations, the communication device 406 may transmit information indicating the attachment status of the bucket tooth 122.

PCB 408 may include a component that permits communication among multiple components of the magnetic sensor 208. The power source 410 may be configured to provide power to the communication device 406, the magnetic switch 404, and/or the like. The power source may include a battery configured to provide electrical power to the communication device 406 (e.g., a coin cell battery), an energy harvester configured to provide electrical power to the communication device 406, and/or the like. The energy harvester may be configured to convert mechanical vibrations associated with operation of the bucket 120 into electrical power.

The PCB 408 may include a controller that determines whether the magnetic switch 404 is actuated. The controller of the PCB 408 may be implemented as a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. The processor may be implemented in hardware, firmware, and/or a combination of hardware and software. The controller of the PCB 408 may include one or more processors capable of being programmed to perform a function. One or more memories, including a random-access memory (RAM), a read only memory (ROM), and/or another type of dynamic or static storage device (e.g., a flash memory, a magnetic memory, and/or an optical memory) may store information and/or instructions for use by the controller. The controller of the PCB 408 may include a memory (e.g., a non-transitory computer-readable medium) capable of storing instructions that, when executed, cause the processor to perform one or more processes and/or methods described herein.

The controller of the PCB 408 may generate, based on whether the magnetic switch 404 is actuated, a message concerning the attachment status of the bucket tooth 122. The controller may determine a message transmission rate based on generating the message. The controller may generate a message indicating that the bucket tooth has a positive attachment status based on determining that the magnetic switch 404 is actuated, a message indicating that the bucket tooth 122 has a negative attachment status based on determining that the magnetic switch 404 is not actuated, and/or the like. In one embodiment of the disclosed invention, the controller may indicate a warning signal when the bucket tooth is partially attached or loose.

The controller of the PCB 408 may cause the communication device 406 to wirelessly transmit the message according to the message transmission rate. In some implementations, the controller, when causing the communication device 406 to wirelessly transmit a message according to the message transmission rate, is configured to cause the message to be received by a different controller associated with the machine 100 (e.g., the ECM 114). In some implementations, the controller of the PCB 408 may determine a transmission rate based on the attachment status determined. For example, the controller of the PCB 408 may determine a first message transmission rate based on determining that the bucket tooth has a positive attachment status and the controller may determine a second transmission based on determining that the bucket tooth has a negative attachment status, where the second message transmission rate is greater than the first message transmission rate. The faster message transmission is designed to help the prompt discovery of the lost tooth.

The ECM 114 may serve as a receiver for a signal sent by the communication device 406. The ECM 114 may be used to receive wireless signals, such as RF signals, Bluetooth®, and/or the like. The receiver may be a different device distinct from the ECM 114. The receiver may include components to receive wireless data, convert the wireless data into a digital message, and output the data. The ECM 114 may include an attachment status analyzer 412, an output device manager 414, a memory 416, a processor 418, and/or the like.

The attachment status analyzer 412 may receive information from the communication device 406 that a magnet is no longer operably connected, which may indicate that a bucket tooth 122 has been detached. The attachment status analyzer 412 may analyze other information (e.g., such as movement of the bucket 120, movement of the machine 100, and/or the like) to determine if it is necessary for a notification that the bucket tooth 122 has been detached. For example, during a maintenance activity, in which someone is removing the bucket tooth 122 and/or replacing the bucket tooth 122, a notification may be unnecessary. Therefore, based on the contextual data reflecting that the machine 100 is in a particular location (such as an equipment maintenance warehouse) and/or other characteristics (e.g., the machine 100 is turned off), the attachment status analyzer 412 may select not to send a loose tooth notification message based on determining that the machine is likely undergoing a maintenance operation.

The output device manager 414 may be used to provide a message and/or notification. For example, the output device manager 414 may determine to output a sound, a visual, and/or the like to provide a notification and/or alert to an operator of the machine 100. The output device manager 414 may include a transceiver-like component (e.g., a transceiver, a separate receiver, a separate transmitter, and/or the like) that enables the ECM 114 to communicate with other devices, such as via a wireless connection. The output device manager 414 may permit the ECM 114 to receive information from another device and/or provide information to another device. For example, the output device manager 414 may include, a radio frequency (RF) interface, a universal serial bus (USB) interface, a wireless local area network interface, a cellular network interface, and/or the like.

The memory 416 stores information and/or software related to the operation and use of the ECM 114. The memory 416 may include a random access memory (RAM), a read only memory (ROM), and/or another type of dynamic or static storage device (e.g., a flash memory, a magnetic memory, and/or an optical memory) that stores information and/or instructions for use by processor 418.

The processor 418 may be implemented in hardware, firmware, and/or a combination of hardware and software. The processor 418 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 418 includes one or more processors capable of being programmed to perform a function.

Figure 5:
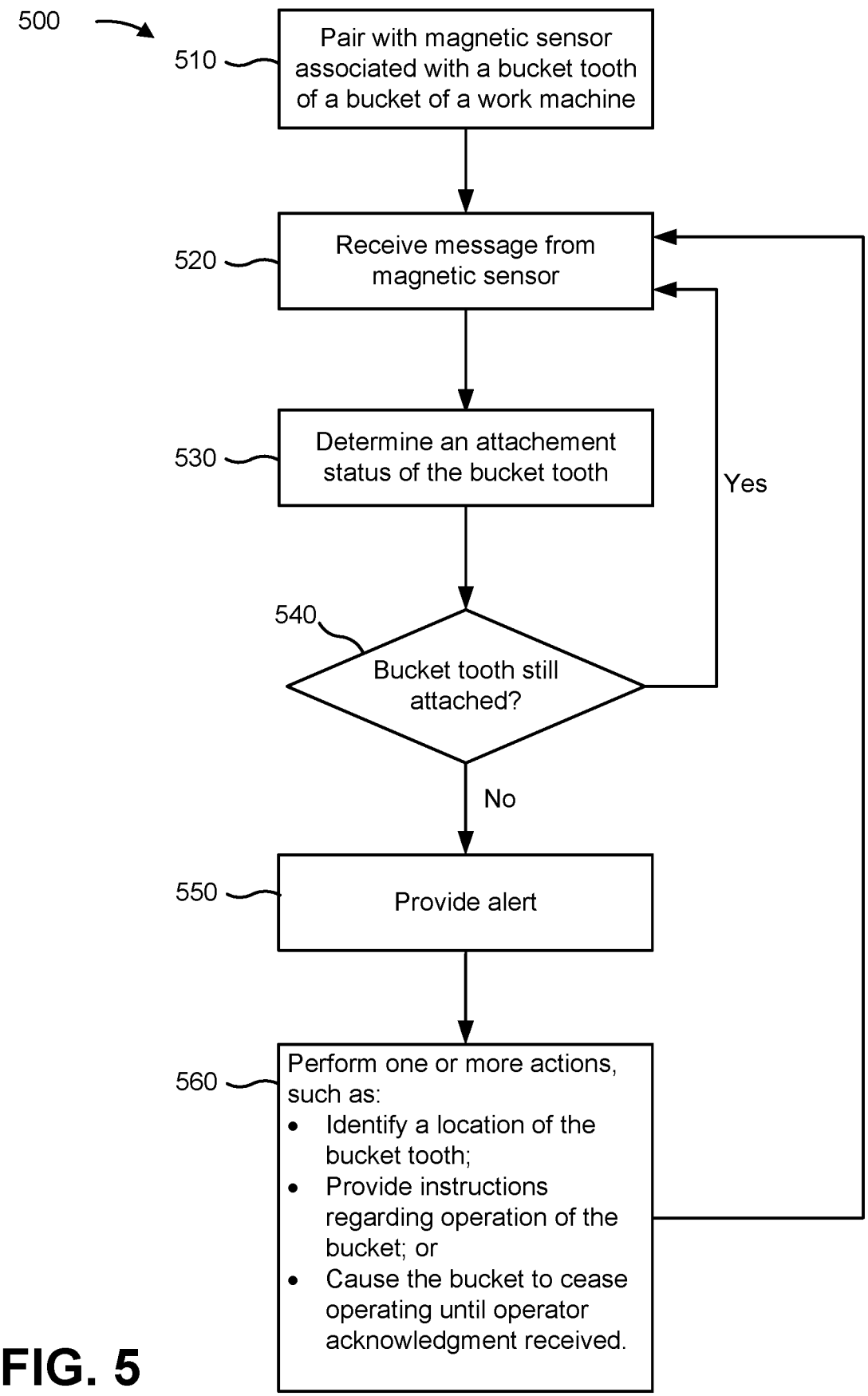
FIG. 5 is a flow chart of an example process performed by a bucket tooth monitoring system described herein.

FIG. 5 is a flowchart illustrating the steps involved in an example implementation of the disclosed invention. The example implementation of FIG. 5 includes an iterative process 500 that may be performed by the ECM 114 to provide an alert, as described herein. At block 510, the ECM 114 pairs with magnetic sensor 208 associated with a bucket tooth 122 of a bucket 120 of a work machine 100. For example, the ECM 114 may establish a connection with the magnetic sensor 208 over a wireless connection (e.g., Bluetooth®, RF, and/or the like). The magnetic sensor 208 may instead pair with a separate device that includes a receiver apart from the ECM 114.

At block 520, the ECM 114 receives a message from the magnetic sensor 208. The message may indicate that the magnetic switch 404 is actuated or not actuated. Additionally, or alternatively, the message may indicate the status of the power source 410 (e.g., a power level). The ECM 114 may receive a message from another device that indicates a status of the machine 100, the bucket 120, and/or the like (e.g., indicating whether the machine 100 is in operation, indicating whether the bucket 120 is moving, and/or the like).

At block 530, the ECM 114 determines an attachment status of the bucket tooth 122. For example, using information about the power level of the battery and the time stamp of the dispatched messages, the ECM 114 may determine whether the bucket tooth 122 is attached or detached from the bucket 120. At block 540, the ECM 114 determines whether the bucket tooth is still attached. The ECM 114 may use the information received in the previous blocks to determine whether the bucket tooth 122 is still attached. For example, if the ECM 114 has information that the machine 100 is not in motion but that the magnetic switch 404 is actuated, the ECM 114 may possibly determine that the bucket tooth 122 was intentionally removed for conducting a maintenance procedure and will be replaced upon completion of the maintenance procedure. Based on the ECM 114 determining that the bucket tooth is still attached, the ECM 114 may iteratively monitor the machine 100 to detect whether a message has been received from the magnetic sensor 208.

At block 550, the ECM 114 may provide a loose tooth alert after determining that the bucket tooth is no longer attached to the bucket of the work machine. Accordingly, the ECM 114 may display an alert notification to a user of the machine 100 that the bucket tooth is no longer attached to the bucket 120 of the machine 100. In another example, the ECM 114 may present an audio notification via a speaker of the machine 100, cause a visual notification indicating the attachment status of the bucket tooth 122 to be displayed on a display of the machine 100, cause activation of a flashing light on the machine 100 to provide an alert regarding the attachment status of the bucket tooth, and/or the like.

At block 560, the ECM 114 may perform one or more actions. The one or more actions may include identifying a location of the bucket tooth, providing instructions regarding the operation of the bucket, or causing the bucket to cease operating until operator acknowledgement is received. As another example, the ECM 114 may receive feedback (e.g., an acknowledgement that an operator of the machine 100 has reviewed the alert), and cause an operation of the bucket 120 to resume based on the feedback.

Figure 6:
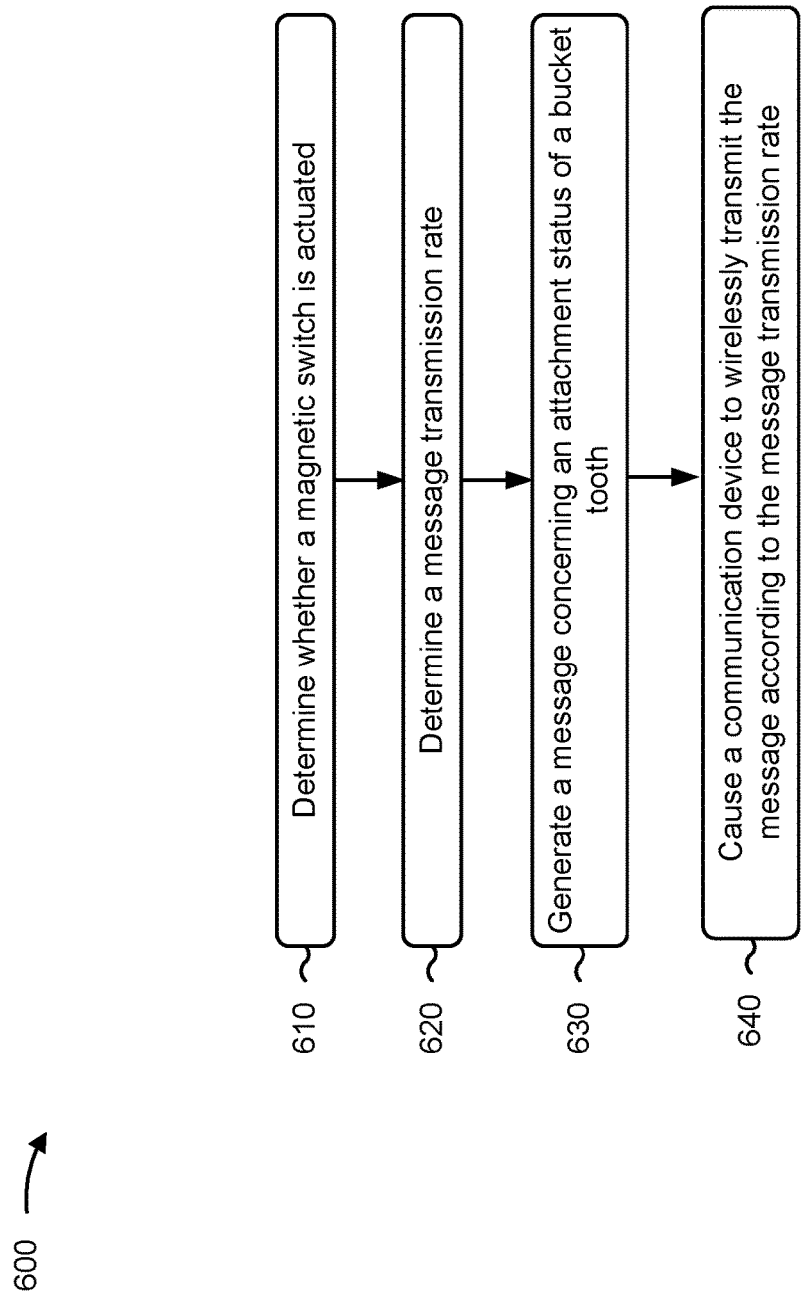
FIG. 6 is a flow chart of an example process performed by a magnetic sensor described herein.

FIG. 6 is a flowchart of an example process 600 for monitoring a bucket tooth system. One or more process blocks of FIG. 6 may be performed by a magnetic sensor (e.g., magnetic sensor 208). Additionally, or alternatively, one or more process blocks of FIG. 6 may be performed by another device or a group of devices separate from or including the magnetic sensor, such as another device or component that is internal or external to the machine 100 (e.g., ECM 114).

As shown in FIG. 6, process 600 may include determining whether a magnetic switch is actuated (block 610). For example, the magnetic sensor 208 (e.g., using magnetic switch 404, PCB 408, power source 410, and/or the like) may determine whether the magnetic switch 404 is actuated.

As further shown in FIG. 6, process 600 may include determining a message transmission rate based (block 620).

For example, the magnetic sensor 208 may determine, based on determining whether the magnetic switch is actuated, a message transmission rate.

As further shown in FIG. 6, process 600 may include generating a message concerning an attachment status of a bucket tooth (block 640). For example, the magnetic sensor 208 may generate, based on determining whether the magnetic switch is actuated, a message concerning an attachment status of a bucket tooth.

As further shown in FIG. 6, process 600 may include causing, based on determining the message transmission rate, a communication device to wirelessly transmit the message according to the message transmission rate (block 630). For example, the magnetic sensor 208 may cause, based on determining the message transmission rate, the communication device 406 to wirelessly transmit the message according to the determined message transmission rate.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

While some implementations described above are directed to a magnetic switch, this disclosure is applicable to any other type of sensor that detects a change from one state to another. Similarly, the bucket tooth 122 may be another component of the machine 100, resulting in a component monitoring system of machine 100.

INDUSTRIAL APPLICABILITY

A work cycle of an operation may include a variety of different cycle segments that are performed by a machine. Certain characteristics of the cycle segments cause certain cycle segments to be more conducive to monitoring certain aspects of the machine or the operation. For example, a cycle segment following a dump operation with the bucket 120 is more conducive to detect a wear status of the bucket teeth 122 than a cycle segment during or following a dig operation (e.g., because the bucket 120 or the implement 116 may obstruct the view of the bucket teeth 122). As another example, a cycle segment following a dig operation with the bucket 120 is more conducive to determine an amount of ground material that is in the bucket 120 than a cycle segment before the dig operation (e.g., because the bucket 120 does not include any ground material).

According to some implementations described herein, a magnetic sensor 208 may utilize a magnetic switch 404 to detect whether a tooth has detached from a bucket, of the machine 100. For example, as described herein, a change in the state of the magnetic switch 404 will result in the magnetic sensor 208 sending information to the ECM 114 or another device to alert that a tooth has been detached from the bucket. In this way, the magnetic sensor 208 may conserve resources (e.g., processing resources, memory resources, and/or the like) associated with attempting to detect a missing tooth, or attempting to remedy a situation caused by missing tooth. For example, the magnetic sensor 208 may provide accurate and relatively faster detection of a missing bucket tooth 122 thus preventing an increase of load on the other bucket teeth, and correspondingly assisting with the overall productivity of the machine 100.

In some implementations, the magnetic sensor 208 may allow not only quicker detection of a missing tooth, but may also aid in locating the missing tooth (e.g., if the magnetic sensor 208 is located on the missing tooth). This conserves resources associated with attempting to locate the missing tooth. For example, sifting process used to sift through a large quantity of mined material to locate the missing tooth may be shortened or eliminated, because of the ability to detect the missing tooth using signals output by the magnetic sensor 208 embedded in the missing tooth.

What is claimed is:

1. A component monitoring system comprising:
   an attachment means positioned on an interior portion of a component of a work machine and configured to engage with a sensor via a switch, wherein the attachment means is a magnet, and wherein the component is a tooth; and
   the sensor positioned on a portion of an adapter of the work machine that interfaces with the component, the sensor comprising:
      the switch configured to actuate when engaged with the attachment means;
      a communication device configured to wirelessly transmit at least one message concerning an attachment status of the component;
      a power source configured to provide power to the communication device, the switch, and a controller; and
      the controller configured to:
         determine whether the switch is actuated;
         generate, based on determining whether the switch is actuated, a message concerning the attachment status of the component;
         determine, after generating the message, a message transmission rate; and
         cause the communication device to wirelessly transmit the message according to the message transmission rate.

2. The component monitoring system of claim 1, wherein the switch is a magnetic switch that includes at least one of:
   a reed switch;
   a Hall Effect sensor; or
   a magnetometer.

3. The component monitoring system of claim 1, wherein the communication device includes at least one of:
   a wireless local area network (WLAN) component;
   a wireless personal area network (WPAN) component;
   a radio rate (RF) communication component; or
   a cellular network connection component.

4. The component monitoring system of claim 1, wherein the power source includes at least one of:
   a battery configured to provide electrical power to the communication device; or
   an energy harvester configured to provide electrical power to the communication device,
      wherein the energy harvester is further configured to convert mechanical vibrations associated with operation of the component into electrical power.

5. The component monitoring system of claim 1, wherein the power source includes a battery, and the message includes:
   information indicating a voltage status of the battery; and
   information indicating the attachment status of the component.

6. The component monitoring system of claim 1, wherein the controller, when generating the message concerning the attachment status of the component, is configured to:
   generate, based on determining that the switch is actuated, the message,
      wherein the message indicates that the component has a positive attachment status.

7. The component monitoring system of claim 1, wherein the controller, when generating the message concerning the attachment status of the component, is configured to:
  generate, based on determining that the switch is not actuated, the message,
    wherein the message indicates that the component has a negative attachment status.

8. The component monitoring system of claim 1, wherein the controller, when causing the communication device to wirelessly transmit the message according to the message transmission rate, is configured to:
  cause the message to be received by a different controller associated with the work machine.

9. The component monitoring system of claim 1, wherein the controller, when determining the message transmission rate, is configured to:
  determine, based on determining that the component has a positive attachment status, a first message transmission rate; or
  determine, based on determining that the component has a negative attachment status, a second message transmission rate,
    wherein the second message transmission rate is greater than the first message transmission rate.

10. A magnetic sensor associated with a bucket tooth of a bucket of a work machine, the magnetic sensor comprising:
  a communication device;
  a magnetic switch; and
  a controller configured to:
    determine whether the magnetic switch is actuated by a magnet positioned on an interior portion of the bucket tooth;
    generate, based on determining whether the magnetic switch is actuated, a message concerning an attachment status of the bucket tooth; and
    cause the communication device to wirelessly transmit the message.

11. The magnetic sensor of claim 10, wherein the controller, when generating the message concerning the attachment status of the bucket tooth, is configured to:
  generate, based on determining that the magnetic switch is actuated, the message,
    wherein the message includes information indicating that the bucket tooth is attached to an adapter of the work machine.

12. The magnetic sensor of claim 10, wherein the controller, when generating the message concerning the attachment status of the bucket tooth, is configured to:
  generate, based on determining that the magnetic switch is not actuated, the message,
    wherein the message includes information indicating that the bucket tooth is not attached to an adapter of the work machine.

13. The magnetic sensor of claim 10, wherein the magnetic sensor is configured to be positioned on a portion of an adapter of the bucket that interfaces with the bucket tooth.

14. The magnetic sensor of claim 10, wherein the magnetic sensor is configured to be positioned on a portion of the bucket tooth that interfaces with an adapter of the bucket.

15. The magnetic sensor of claim 10, wherein the controller, when causing the communication device to wirelessly transmit the message, is configured to:
  cause at least one component of the work machine to provide an alert concerning the attachment status of the bucket tooth.

16. A method, comprising:
  receiving, by a controller associated with a work machine and from a magnetic sensor configured to engage with a magnet positioned on an interior portion of a bucket tooth of a bucket of the work machine, a message concerning an attachment status of the bucket tooth;
  determining, by the controller and based on the message, the attachment status of the bucket tooth;
  selectively causing, by the controller and based on the attachment status of the bucket tooth, at least one component of the work machine to provide an alert; and
  selectively causing, by the controller and based on the attachment status of the bucket tooth, one or more actions to be performed.

17. The method of claim 16, wherein selectively causing the at least one component of the work machine to provide the alert comprises at least one of:
  selectively causing, based on the attachment status of the bucket tooth, a light of the work machine to activate;
  selectively causing, based on the attachment status of the bucket tooth, a sound to be outputted via a speaker of the work machine; or
  selectively causing, based on the attachment status of the bucket tooth, information indicating the attachment status of the bucket tooth to be displayed on a display of the work machine.

18. The method of claim 16, wherein the bucket tooth has a negative attachment status, and
  wherein the one or more actions include:
    causing operation of the bucket to cease;
    generating, after causing the operation of the bucket to cease, information indicating that the bucket tooth has the negative attachment status;
    causing the information to be displayed on a display of the work machine;
    receiving, after causing the information to be displayed on the display of the work machine, an acknowledgment indicating that an operator of the work machine reviewed the information; and
    causing, based on receiving the acknowledgment, the operation of the bucket to resume.

19. The method of claim 16, wherein the bucket tooth has a negative attachment status, and
  wherein the one or more actions include:
    receiving one or more additional messages concerning the attachment status of the bucket tooth;
    processing the message and the one or more additional messages to identify a location of the bucket tooth; and
    causing a display of the work machine to display information indicating location information regarding the bucket tooth.

20. The method of claim 16, wherein the one or more actions include:
  saving the message in a data structure;
  generating a report, based on the data structure, concerning the attachment status of the bucket tooth; and
  sending the report to another device.

* * * * *